(12) United States Patent
Oram et al.

(10) Patent No.: US 7,749,035 B2
(45) Date of Patent: Jul. 6, 2010

(54) BUOYANCY CLAMP AND METHOD OF APPLICATION

(76) Inventors: Robert Kenneth Oram, Balmoral Group Limited, Balmoral Park, Loiriston, Aberdeen (GB) AB12 3GY; Kevan Frederik Stokes, Balmoral Group Limited, Balmoral Park, Loiriston, Aberdeen (GB) AB12 3GY; Ewan George Lawrence Reid, Smithfield, Crathes, Aberdeenshire (GB) AB31 5JE ( * ) Notice: Subject to any disclaimer, the term of this patent is extended or adjusted under 35 U.S.C. 154(b) by 0 days.

(21) Appl. No.: 10/552,718

(22) PCT Filed: Apr. 11, 2003

(86) PCT No.: PCT/GB03/01549

§ 371 (c)(1),
(2), (4) Date: Oct. 26, 2006

(87) PCT Pub. No.: WO2004/090348

PCT Pub. Date: Oct. 21, 2004

(65) Prior Publication Data

US 2007/0087639 A1 Apr. 19, 2007

(51) Int. Cl.
*B63B 22/00* (2006.01)
*B63B 51/02* (2006.01)
*F16L 1/12* (2006.01)

(52) U.S. Cl. ..................................... 441/133; 405/171
(58) Field of Classification Search ................. 441/133; 405/171
See application file for complete search history.

(56) References Cited

U.S. PATENT DOCUMENTS

| 3,323,763 | A | * | 6/1967 | Butts .......................... 248/606 |
| 3,848,638 | A | | 11/1974 | Huslander et al |
| 4,249,610 | A | | 2/1981 | Loland |
| 4,381,020 | A | * | 4/1983 | Daghe et al. .................. 138/99 |
| 4,477,207 | A | | 10/1984 | Johnson |
| 5,711,639 | A | * | 1/1998 | Tessier et al. ............... 405/171 |
| 6,282,756 | B1 | | 9/2001 | Jan van Walraven |

FOREIGN PATENT DOCUMENTS

| EP | 0787938 A2 | 8/1997 |
| GB | 1582635 | 1/1981 |
| GB | 2286649 A * | 8/1995 |
| GB | 2288205 A | 10/1995 |
| JP | 2000-002364 A | 1/2000 |

* cited by examiner

*Primary Examiner*—Daniel V Venne
(74) *Attorney, Agent, or Firm*—Michael Y. Epstein

(57) ABSTRACT

A clamp for securing to a pipe or flowline for mounting buoyancy thereon, the clamp comprising: (i) a clamp body (2) having surfaces against which buoyancy may abut, (ii) a strap (6) for urging the clamp towards the pipe, and (iii) a radially resilient member (9) capable of expanding or contracting to conform to changes in diameter of the pipe.

2 Claims, 5 Drawing Sheets

BUOYANCY CLAMP AND METHOD OF APPLICATION

FIELD OF THE INVENTION

This invention relates to a clamp for clamping buoyancy to an object. More especially but not exclusively the invention relates to clamps for clamping distributed buoyancy to subsea risers and umbilical lines. Hereinafter the word "flowline" will be used to embrace risers and umbilical lines.

BACKGROUND AND DISCUSSION OF THE PRIOR ART

In order to extract hydrocarbons from underwater it is often necessary to provide flowlines extending from the seabed to the surface. If the flowline merely depended from a surface mounting the weight of the dependent flowline would, unless the flowline was made uneconomically strong, be likely to part. In order to prevent this buoyancy is mounted around the flowline along its length. It is not however possibly to merely bolt the buoyancy to the flowline.

All flowlines are made to a manufacturing tolerance on diameter which means that the actual diameter of the flowline will probably differ from a nominal size. Buoyancy or clamps machined to fit the nominal size flowline will be too small for a flowline larger than nominal and too small for a flowline larger than nominal. In either case the buoyancy will not be secured to the flowline with optimal efficiency and it may not be able to resist the upthrust up on it, causing it to shift.

In some cases securing mismatched sized buoyancy to a flowline may cause damage to the flowline.

Not all flowlines are of constant diameter in any event. Some flowlines, such as flexible risers, are made of material which expands or contracts in response to changes in internal pressure of the contents, the load, ambient temperature or the temperature of the flowline contents.

Additionally some flowlines are not in a straight line and bending of the flowline requires the buoyancy to be of larger diameter than when the flowline is linear.

Furthermore some flowline materials creep. Creep is long term dimensional change in response to load.

To overcome these problems the present applicants devised a so-called riser clamp which is described in GB 2 286 649. This product, since much imitated, comprises a flexible clamp which is clamped around the riser or flowline. Because the clamp is flexible it can conform closely to the flow line. A buoyancy member can be provided with a pocket which has surfaces engaging the clamp. Buoyancy load is therefore transferred from the buoyancy to the flowline.

While this invention went a considerable way towards overcoming the problem of installing buoyancy onto flowlines the solution was not perfect and a number of problems remained. Installation is time consuming and involves a large number of loose parts. When one is attempting to install the riser clamps on an exposed deck of a pipelay vessel in extreme conditions, the desirability of quick installation with few parts to get lost quickly becomes apparent.

In installing the bolts fastening the clamp together there is a danger of cross-threading the bolts with the risk of heat build-up and degradation of physical properties.

While the clamp described in GB 2 286 649 goes some way towards providing an even pressure distribution about the flowline and succeeds to a much greater extent than rigid clamps as described for example in GB 2 288 205 still more even pressure distribution would be desirable.

The invention seeks to reduce at least some of the problems with the prior art devices.

SUMMARY OF THE INVENTION

According to the invention there is provided a clamp for securing to a pipe or flowline for mounting buoyancy thereon, the clamp comprising:
- i) a clamp body having surfaces against which buoyancy may abut
- ii) means for urging the clamp towards the pipe, and
- iii) a radially resilient member capable of expanding or contracting to conform to changes in diameter of the pipe.

BRIEF DESCRIPTION OF DRAWINGS

Embodiments of the invention will be described by way of non-limiting example by reference to the accompanying figures of the drawings, of which.

Prior art clamps have relied on the resilient properties of materials such as Kevlar® and titanium which have low stiffness to strength ratios. Kevlar® being superior in these properties to titanium. However the available elasticity in these systems is often marginal or insufficient for service requirements. In accordance with the invention a radial spring comprising a resilient material such as resilient polymeric material, for example elastomers such as compounded natural or synthetic rubbers, are interposed between the pipe and the means for exerting a clamping force on the pipe.

Figure 1:
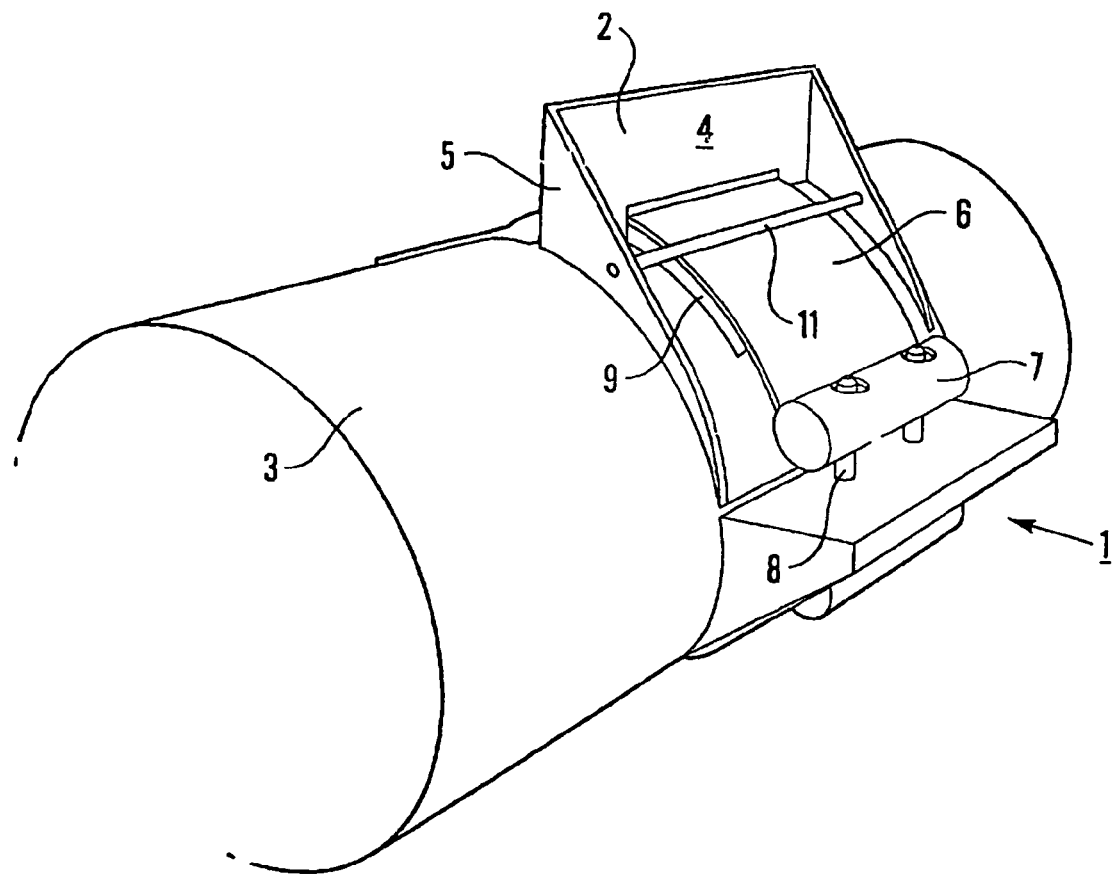
FIG. 1 is a perspective view of a first embodiment of the invention mounted on a (partially illustrated) pipe.

Referring to FIG. 1, clamp 1 comprises a clamp body 2. Desirably the stiffness of clamp body 2 is anisotropic. Preferably clamp body 2 is flexible in the sense of conforming to the pipe 3 but rigid in a direction parallel with the axis of the pipe 3.

Clamp body 2 could for example be made of a fibre reinforced plastics (FRP) material. The reinforcing fibres may be, for example, glass, metal carbon or mixtures thereof. The plastics matrix may comprise for example epoxy, polyester, vinyl ester or other thermosetting resins. Appropriate lay-up of the fibres can assist in achieving the desired anisotropy in stiffness. Those skilled in the art will be able to devise other suitable materials.

FRP is particularly suitable because it has other properties useful in a clamp body.

First FRP allows the clamp body to be of low weight. While FRP is of greater density than water (typical values may be in the range 1 600 to 2 600 kgm$^{-3}$) the clamp can be made of relatively thin section material and thus the clamp body can be lightweight. This is desirable because it means that the clamp body can be handled more easily than a heavier clamp body. Dense and heavy clamps can have negative buoyancy which must be offset by the positive buoyancy clamped to the pipe. This buoyancy is expensive and bulky.

Secondly because the FRP is flexible it conforms well to the pipe especially when aided by the radial spring to be described hereinafter. This results in good pressure distribution around the pipe and thus reducing the likelihood of high local loading and pipe damage which can occur with stiff clamps.

Because FRP is tough and resilient, brittle fracture which can occur with other materials such as thick syntactic foam, during installation or subsequently is much less likely.

Hydrocarbon or other material passing through the pipe can be warm or hot. Some of the heat will be transferred to the pipe's surroundings. Syntactic foam is a good thermal insulator and so heat transferred to it will be retained resulting in local heating of the clamp or pipe. Since physical properties are often strongly dependent on temperature, local heating can degrade performance.

FRP being of relatively high thermal conductivity and used in relatively thin section in contrast dissipates heat fairly well preventing local overheating. Heat dissipation is however unlikely to be sufficiently great as to cause problems with hydrate formation, waxing or large increases in viscosity of the hydrocarbon contained in the pipe.

Clamp body 2 may comprise a single C shaped member or it may comprise a plurality of sectors. In the illustrated embodiment five sectors are provided to give good, even transfer of load.

Clamp body 2 is provided with a plurality of upstanding fins 4 against which, in use, the buoyancy can abut. Supporting ribs 5 are provided to prevent breakage of the fins. Care has to be taken that the ribs do not stiffen excessively the clamp. In the embodiment of FIG. 1 supporting ribs 5 are provided on only one side of each fin 4. Additionally the flat faces of the ribs 5 form surfaces against which, in use, the buoyancy may abut, thereby transferring load to the flowline.

Fins 4 have a slot provided therein through which passes a strap 6. Strap 6 is intended in use to be tightened so as to urge the clamp body 2 against the pipe 3 thereby causing the clamp 1 to be mounted firmly to the pipe and able to transfer buoyancy load to the pipe. In the illustrated embodiment strap 6 comprises titanium. GB 2 288 205 describes a titanium strapped riser clamp but in this clamp the titanium strap functions in a different way from that of the strap of the invention. In the strap of GB 2 288 205 titanium is employed principally for its elasticity which allows the pipe and associated clamp to differ in size for a nominal dimension. In the present invention titanium is used principally for other reasons, notably to control the relative orientation and position of the individual sections of the assembly since it is less flexible than Kevlar®. Titanium is well known in the art for its lightweight and resistance to corrosion by seawater, which properties are useful in the present invention.

Strap 6 is in the embodiment of FIG. 1 provided with axis bar terminations 7 to which it is welded or otherwise secured. It can be much easier to control the dimensions of this arrangement than to control the dimensions of a Kevlar® strap. This allows the axis bars to be joined by shorter bolts 8 which means that less time is required to fasten the clamp to the pipe which can be important in off-shore installation. As will be apparent hereinafter the clamp of the invention works in a different way from prior art clamps such as described in GB 2 288 205. In the present invention elasticity is not principally provided by the strap 6 but by a resilient layer to be described hereinafter. Since the strap 6 is not functioning primarily as an elastic member it need not be strained as highly as in the prior art arrangements as described in GB 2 288 205. Since the strap is not subject to strain creep is much less of a problem than with the prior art titanium strapped clamp. Additionally since the strap is subject to much less strain than in the prior art arrangement there is less heating of screw-threaded fasteners 8 and hence a reduce likelihood of galling of the thread.

It will additionally be noted that the axis bars are inboard of the strap edge, reducing the bending moment of the strap ends and removing the maximum bending moment away from the strap edge. This reduces the prospect of damage or faults at the edge which can result in crack propagation.

Change in dimension from the designed nominal amount is in the present invention principally accommodated not so much by elasticity of the strap as by a radial spring interposed between the means exerting load on the pipe and the pipe itself. In the embodiment of FIG. 1 the radial spring comprises a resilient layer 9 intermediate the strap and the clamp body 2. It will be apparent to the skilled worker and exemplified hereinafter that the resilient layer 9 need not lie intermediate the clamp body 2 and the strap 6 but could lie inboard of the clamp body.

Resilient layer 9 comprises an elastomeric layer, for example of compounded natural or synthetic rubbers. This layer is able to take up differences in size from a nominal value. The material should be resistant to stress relaxation which is long term change in load in response to fixed displacement.

Resilient layer 9 serves a number of purposes. As noted its principal function is to accept changes in dimension from the nominal design value whether as a result of manufacturing tolerance or movement in service. To achieve this, the resilient material conforms to changes due to dimensional change in the pipe. Some resilient materials such as rubber have a high Poisson's ratio which means that while resilient they are almost incompressible. This means that spaces need to be provided into which the resilient material can move. This can conveniently be achieved by providing the resilient material in a plurality of spaced apart sections or in a single section with a plurality of gaps. In the embodiment of FIG. 1 the resilient layer 9 can deform into the space 10 adjacent to the axis bars.

Provided that the coefficient of friction between the resilient layer and at least one of the other components against which it abuts is low, resilient layer 9 has another advantage especially when the resilient layer 9 lies intermediate the strap and the clamp body. In the prior art arrangements relative movement between the strap and the clamp body may not occur due to the "capstan effect" of the strap passing around much of the clamp body. The resilient layer facilitates relative movement and hence allows more efficient transfer of load.

In the illustrated embodiment a plurality of plastics rods 11 extend between ends of the clamp thereby keeping the strap and resilient layer captive and thus enhancing handleability of the clamp prior to and during fitting.

Figure 2:
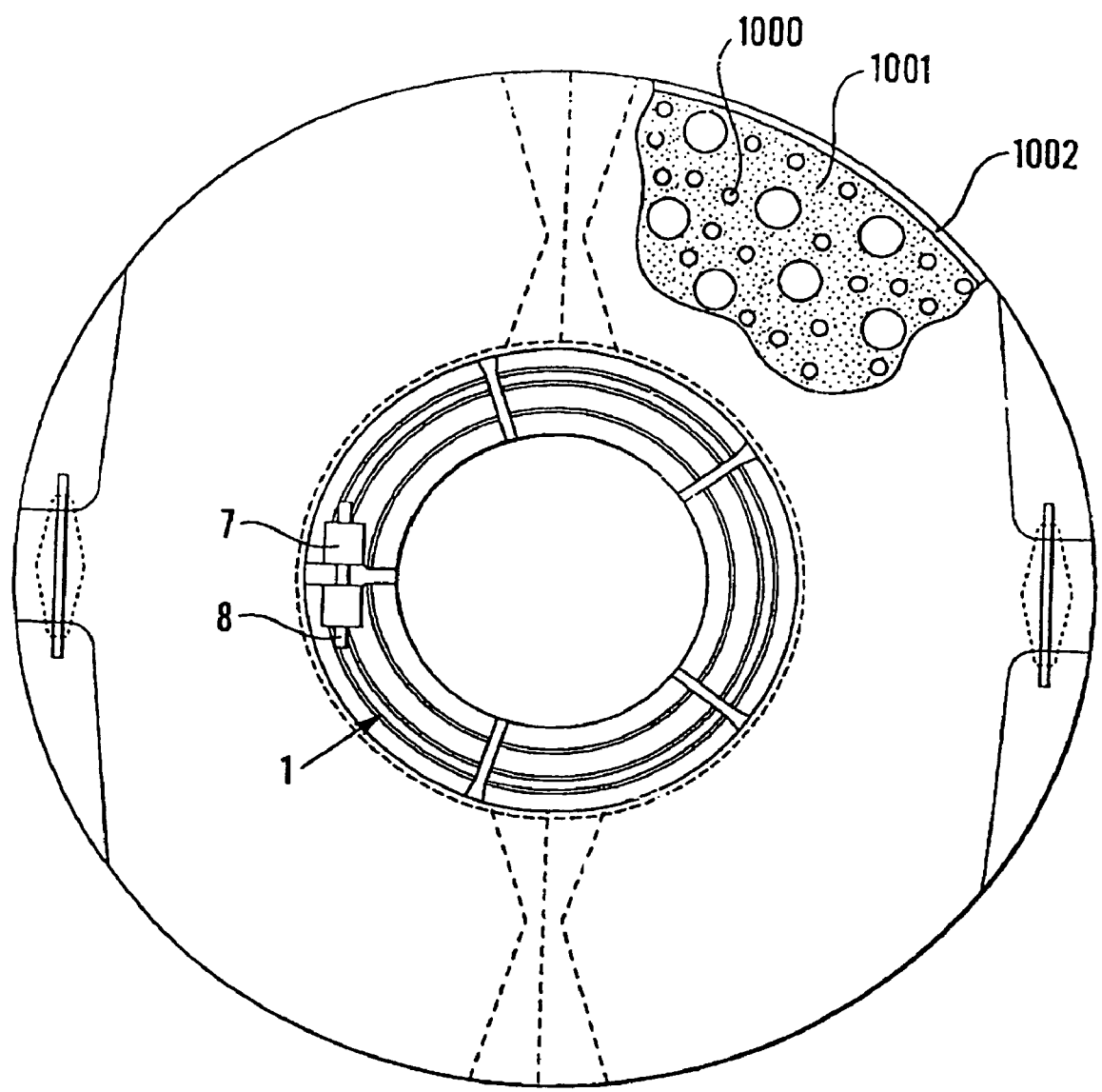
FIG. 2 is a partially sectioned end elevation of a clamp having buoyancy mounted thereon.

As can be seen from FIG. 2 once installed around the pipe the clamp is jacketed by a buoyant body provide with a pocket which bears against the fins thereby transferring buoyancy load to the pipe.

Those skilled in the art will have no difficulty in devising suitable buoyant materials. In an embodiment of the invention shown in FIG. 2 the buoyant material comprises glass reinforced epoxy macrospheres 1000 encapsulated in epoxy syntactic foam 1001. The buoyancy can have an integral glass fibre reinforced plastic skin 1002 which may be provided with an antifouling coating. The arrangement of FIG. 2 is by no means the only way in which the invention can be embodied.

Figure 3:
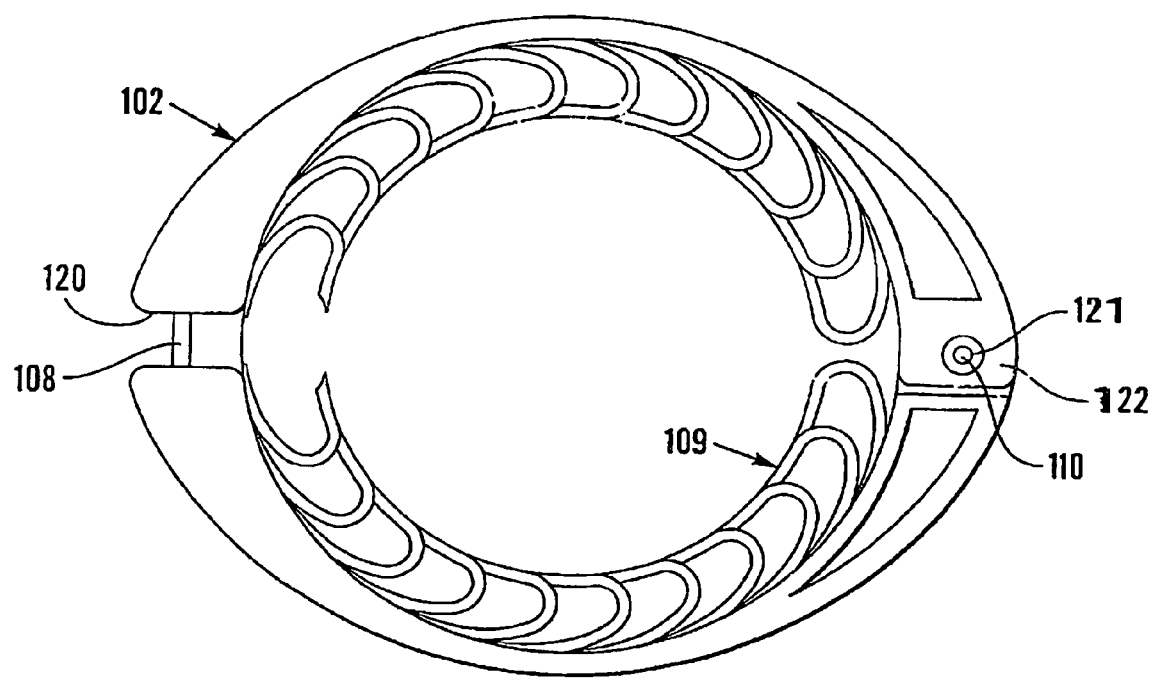
FIG. 3 is a view of a further embodiment of the invention.
Figure 4:
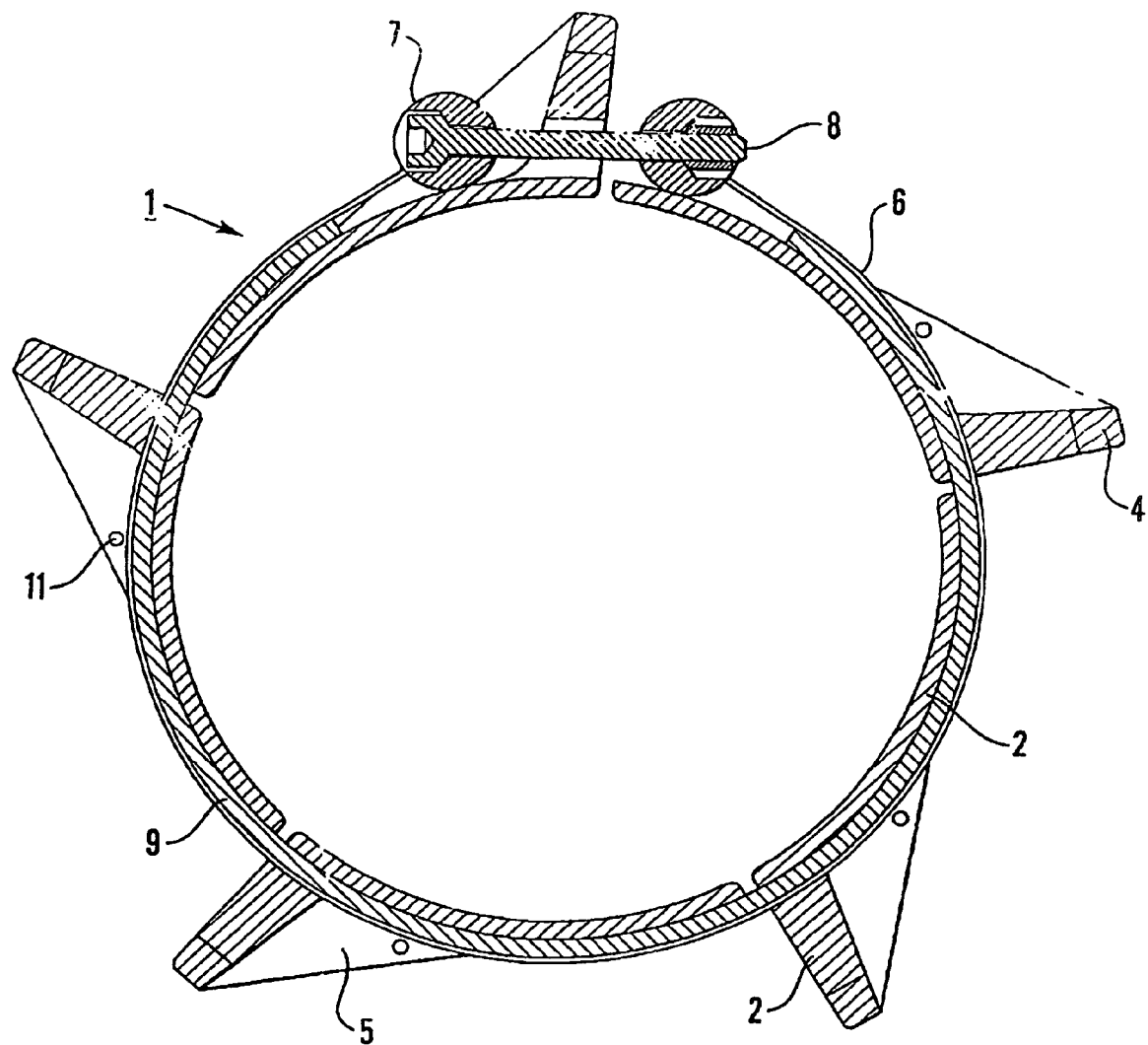
FIG. 4 is an elevation of a first embodiment of the invention.
Figure 5:
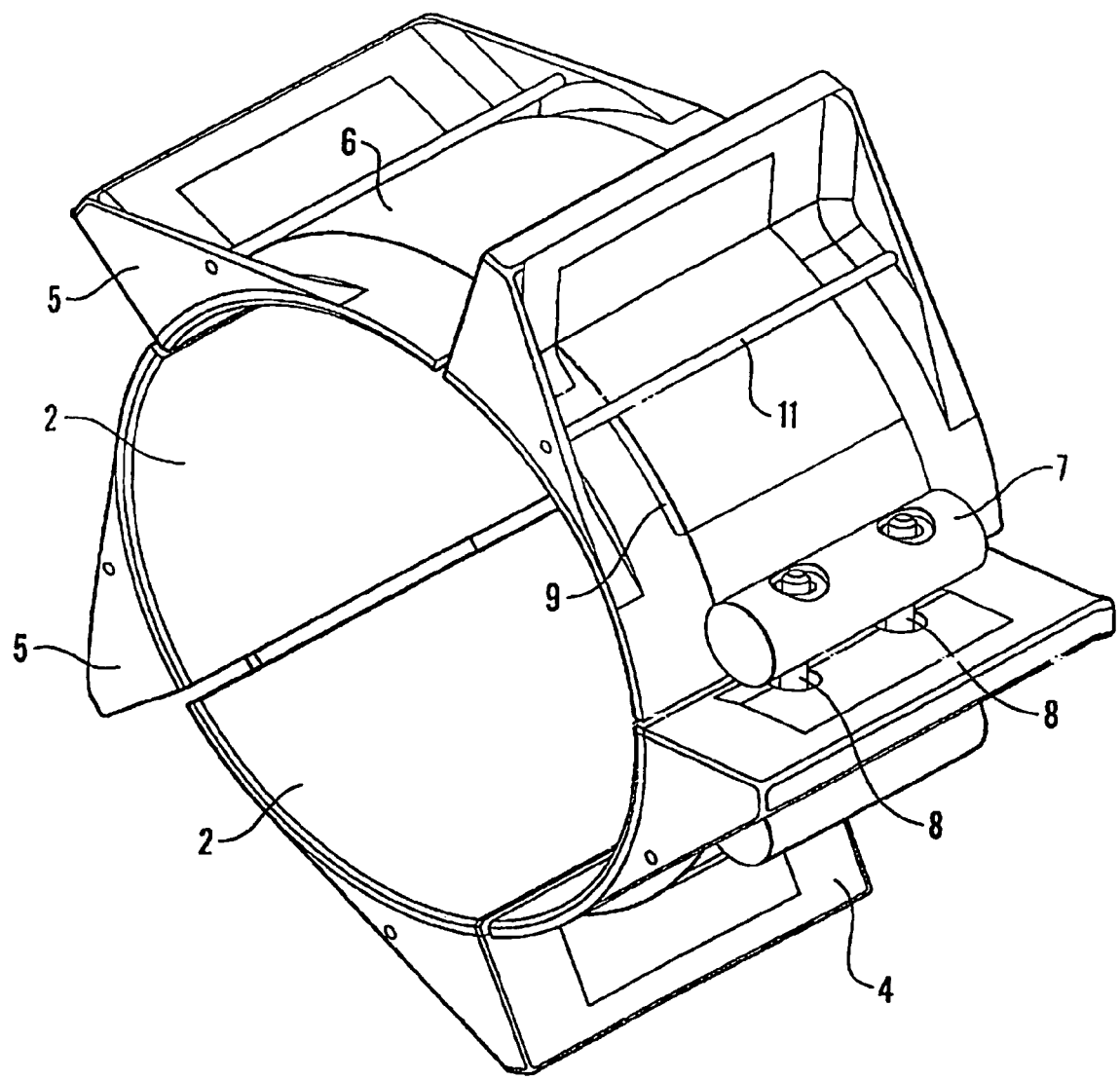
FIG. 5 is a perspective view of a first embodiment of the invention.

FIG. 3 illustrates a further embodiment of the invention. In this embodiment clamp body 102 comprises for example a fibre-reinforced material. Once again the body is desirably flexible in the sense of conforming to the pipe but relatively rigid in the direction of the axis of the pipe.

Intermediate the clamp body 102 and the pipe lies radial spring member 109. In this embodiment, rather than simply comprising a layer of resilient material, radial spring member or resilient layer 109 comprises a plurality of arcuate resilient leaves. Resilient layer 109 can then take up changes in dimension of the pipe from a nominal as described by reference to the embodiment of FIG. 1. It will be apparent to the skilled worker that shapes other than resilient leaves can be adopted, examples including waisted tubes.

The embodiment of FIG. 3 does not require a discrete strap: body 102 provides the strapping functionality. Body 102 comprises a pair (or other number including one) of body members. The free edges 120 of body 102 are urged together to exert a load on the pipe. In the illustrated embodiment, the body members are joined at one extremity by screw threaded fasteners 108 and at the other by pivot 110. The clamp may conveniently be mounted on the pipe by mounting the screw thread fasteners in position by hand or using a nut runner or other tool in the absence of a significant load. The clamp is then placed around the pipe and the ends 122 carrying the pivot hole 121 urged together with a temporary clamp until a pivot pin can be inserted in the pivot holes. The temporary clamp can then be removed leaving the clamp positioned. This fastening technique avoids the need to fasten screw-threaded fasteners under heavy load.

The invention claimed is:

1. A method of mounting buoyancy on a pipe comprising the steps of:
   a) mounting about a pipe a clamp comprising:
      i) a clamp body having surfaces against which buoyancy may abut,
      ii) a strap including means for tightening the strap extending completely around the exterior of the clamp body, and
      iii) a radially acting spring capable of expanding or contracting to conform to changes in diameter of the pipe,
   the method further comprising:
   b) tightening the strap for urging the clamp body towards the pipe, and
   c) mounting buoyancy on the clamp body.

2. A method according to claim 1 including disposing said spring outboard of the clamp body.

* * * * *